J. Borden,
Fruit Jar,
Nº 19,964. Patented Apr. 13 1858.
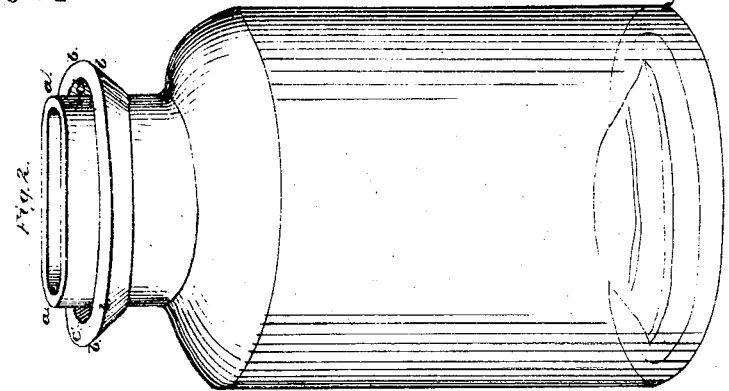
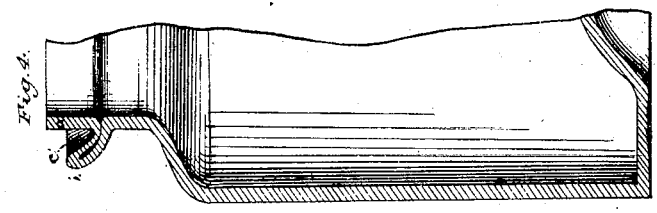
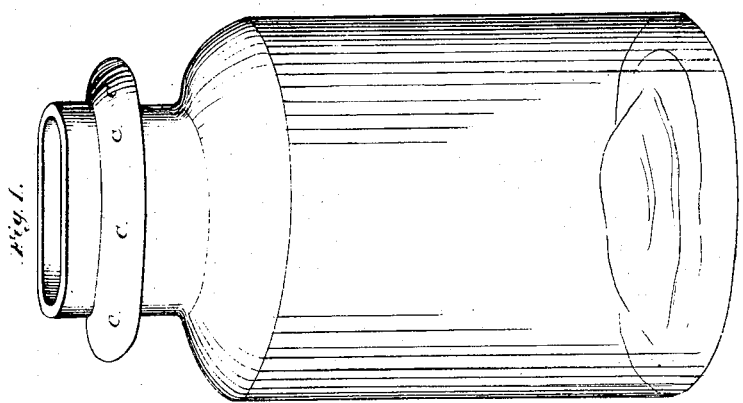
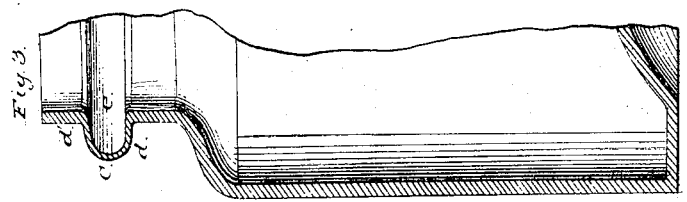

UNITED STATES PATENT OFFICE.

J. BORDEN, OF BRIDGETON, NEW JERSEY, ASSIGNOR TO DAVID POTTER AND FRANCIS L. BODINE.

IMPROVEMENT IN PRESERVING-JARS.

Specification forming part of Letters Patent No. 19,964, dated April 13, 1858.

*To all whom it may concern:*

Be it known that I, JOSEPH BORDEN, of Bridgeton, Cumberland county, in the State of New Jersey, have invented a new and Improved Preserving-Jar, designed for hermetically sealing fruits, vegetables, &c., which are intended to be protected from the action of atmospheric air. The following is a full, clear, and exact description, reference being had to the accompanying drawings, forming part of this specification, in which—

Figure 1 represents a perspective view of the jar in an unfinished state, with a projecting hollow bead around the neck. Fig. 2 represents a perspective view of the jar when finished. Fig. 3 represents a vertical section of Fig. 1. Fig. 4 represents a vertical section of Fig. 2.

My improvements in preserving-jars relate more especially to those made of glass, and to that class in which a groove or recess is formed on the outside to hold the cementing material by which the cap or cover is hermetically sealed to the jar.

Heretofore the groove has been formed by making a vertical depression in the top of the jar, or by welding to the neck or wall of the jar an annular cup-shaped flange to receive the cement. The objection to forming the groove in the top of the jar is that a corresponding projection is produced on the interior, which leaves a cavity between this projection and the wall of the jar, from which it is next to impossible to expel the air. Thus the jar is rendered defective for the purpose to which it is applied.

The second mode of forming the groove is objectionable from the necessity of making the cup so thick and heavy that it may have sufficient strength to resist blows, while this very thickness renders the jar more liable to crack when heated. The jaws are more expensive than those first named, from the additional amount of material required to make them, and from the increased cost of their manufacture by reason of the secondary process they pass through to attach the lip.

The object of my improvement in preserving jars is to overcome the before-mentioned defects and produce a better and cheaper article, that can be afforded to the trade at less cost; and my invention consists in the method by which the groove for holding the cement is formed around the neck or body of the jar, and this method consists in blowing the jar with an exterior hollow head or projection surrounding either the neck or body at the point at which the groove is to be formed, and then, while the jar is in a plastic state, uniting the walls of the projections, so as to convert it into an external annular groove.

By reference to the accompanying drawings the manner in which the groove is formed will be more clearly understood.

The glass jar is blown in a mold in which there is an annular groove near its top, by which an annular rounded and hollow projection, C C, is formed around the neck of the jar. While the jar is in the mold, or as soon as it is removed therefrom, and while it is in a hot and plastic condition, pressure is applied to the top $a$ of the jar and the ring C by means of a former, which embraces the neck of the jar and enters the mouth, and as the ring is thinner than the walls of the jar it yields under the pressure, the top of the jar above the ring sinks, and the interior edges of the groove are brought in contact and united, leaving the interior of the neck smooth, so as to allow for escape to the air. The upper wall, $a'$, is also depressed, brought in contact, and unites to the lower wall, $a'$, thus forming an annular groove, $c'$, around the neck of the jar, and at the same time the mouth of the jar is rounded and finished smooth by the pressure of the former. As the ring C C is only about half the thickness of the jar, the cup which it forms when its walls are brought together is about the same thickness as the wall of the jar. Thus this jar, with its exterior cup, $b$, is much less liable to crack when heated than those in which the cup is welded to the exterior, as has heretofore been the practice.

The exterior cup may be made by blowing the jar with a flanged mouth with a raised edge, and the groove is formed by sinking the flange by a former down and around the outside of the mouth of the jar, the flange forming the inner and bottom wall of the groove and the raised edge the outer wall.

The facility with which these jars are manufactured enables me to afford to the consumer a better and cheaper article than has heretofore been produced at a greatly-diminished cost.

What I claim as an article of manufacture, and desire to secure by Letters Patent, is—

A preserving-jar in which the cup or groove for holding the cement is formed on the exterior from the wall of the jar by the method herein described.

JOSEPH BORDEN.

Witnesses:
 JOHN ROBINSON,
 CLEMT. B. McCARTHY.